(12) United States Patent
Forrest et al.

(10) Patent No.: US 7,526,830 B2
(45) Date of Patent: May 5, 2009

(54) THREE SIDED SWAB

(75) Inventors: Edward J. Forrest, Marietta, GA (US); Paul M. Blair, Jonesboro, GA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/562,568

(22) Filed: Nov. 22, 2006

(65) Prior Publication Data

US 2007/0124883 A1   Jun. 7, 2007

Related U.S. Application Data

(60) Provisional application No. 60/742,657, filed on Dec. 6, 2006.

(51) Int. Cl.
*B08B 1/00* (2006.01)
(52) U.S. Cl. .................... 15/210.1; 15/209.1; 604/1
(58) Field of Classification Search ............ 15/209.1, 15/210.1, 223, 224; 604/1
See application file for complete search history.

(56) References Cited

U.S. PATENT DOCUMENTS

| | | | |
|---|---|---|---|
| 1,682,657 A * | 8/1928 | Blank | 604/1 |
| 4,899,416 A | 2/1990 | Francis | |
| 5,214,821 A * | 6/1993 | Burrow et al. | 15/210.1 |
| 5,363,532 A * | 11/1994 | Sargent | 15/268 |
| 2002/0088073 A1* | 7/2002 | Kammerer et al. | 15/209.1 |
| 2003/0108846 A1* | 6/2003 | Hoertsch | 433/216 |
| 2004/0128786 A1 | 7/2004 | Policicchio | |

FOREIGN PATENT DOCUMENTS

| | | |
|---|---|---|
| DE | 102004008829 | 9/2005 |
| EP | 1473092 | 11/2004 |
| GB | 2285915 | 8/1995 |

* cited by examiner

*Primary Examiner*—Mark Spisich
(74) *Attorney, Agent, or Firm*—Mark W. Croll; Donald J. Breh; Levenfeld Pearlstein, LLC

(57) ABSTRACT

A cleaning swab is for wet or dry use. The swab includes a handle defining a longitudinal axis. The handle is elongated and has a cleaning head end having a tip, and a grasping end. A cleaning head is mounted to the handle. The cleaning head is formed from a strip of material having an inner surface and an outer surface. The material is affixed to the handle at the inner surface, and extends along the handle, over the tip and along an opposite side of the handle. The head defines a loop at the handle tip spaced from the tip. The strip of material extends along the handle to define major cleaning surfaces and the loop defines an inner annular cleaning surface.

14 Claims, 1 Drawing Sheet

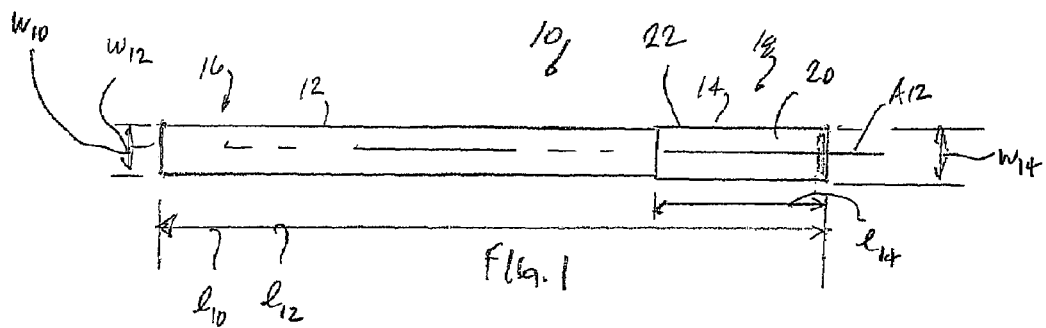
FIG. 1
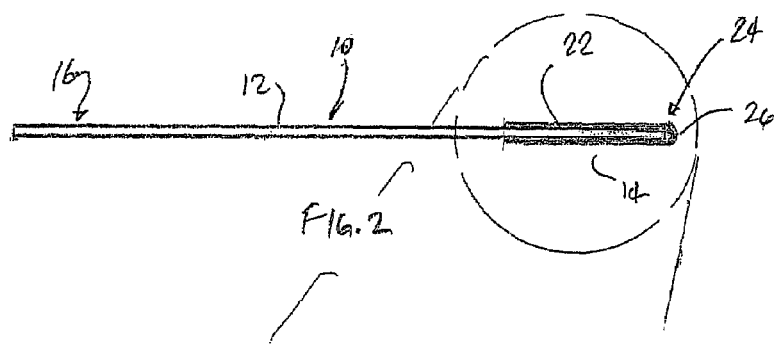
FIG. 2
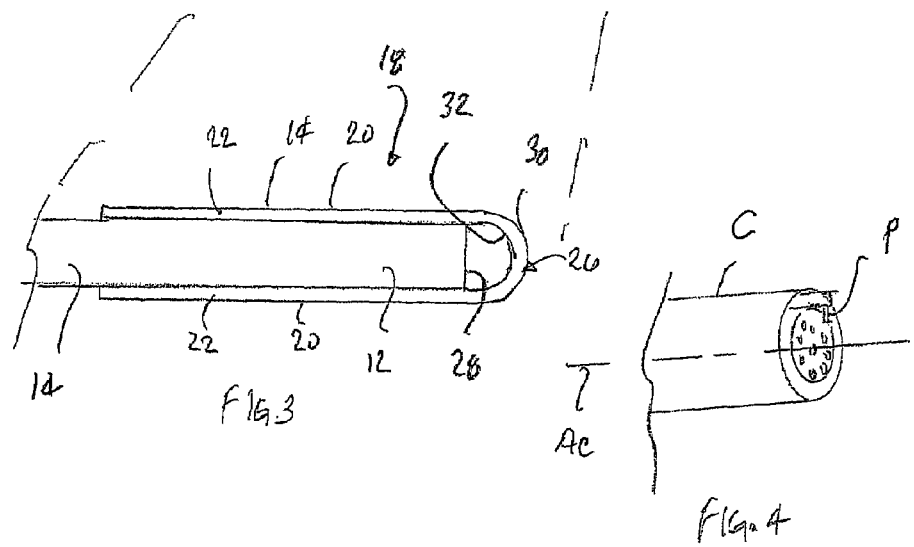
FIG. 3
FIG. 4

THREE SIDED SWAB

This application claims priority to Provisional Application No. 60/742,657, filed Dec. 6, 2006.

BACKGROUND OF THE INVENTION

The present invention is directed to a swab for cleaning. More particularly, the present invention pertains to a swab having a different cleaning surfaces on a single cleaning head.

Swabs are used in all manners of cleaning. For example, everyone will recognize common cotton tipped swabs that are used for personal hygiene and care. Because of the compact and effective nature of these swabs, they have been adopted for use in numerous areas of technology and manufacture. One such area is the manufacture of advanced optical components for use in aerospace and navigation systems.

Fiber optic components, such as fiber optic connectors, are also widely used in telecommunications. During manufacture and use of optical components it is not unusual for pieces of manufacturing debris, such as dust and fibers or other particulate debris to be left on surface of the components. It is also not unusual for light oils, such as fingerprint and other natural skin oils to be found on many of these parts.

Moreover, when out "in the field", the outer casings or shells of the connectors can become dirty and soiled from exposure to the environs. As such, during maintenance and/or repair, the connectors themselves can become soiled with dirt, oils and other debris. It will be appreciated that the debris and oils can significantly degrade, distort or prevent the proper and precise transmission of images.

There are many types of connectors that are used in fiber optic cable installations. The type of connector can vary depending upon the type of use (e.g., harsh versus mild environments), the number of strands (for example, 6, 12, or 18 strands) in the cable, and the physical arrangement of the strands within the cable. The fiber (optical) strands are aligned with metal pins to assure continuity of the signal between the connections. Since the connections are minute, most commonly there are strands that are "shrouded" by the alignment pins making cleaning a difficult operation. Cleaning the connections is paramount for existing and anticipated high speed fiber optic transmissions. One particular type of connector (an MT-type ribbon connector, which has alignment pins) can be very difficult to properly clean, especially the fibers that are along side of the alignment pins.

Numerous types of cleaning implements have been used, with some degrees of success, to clean these particularly sensitive components and areas. Swabs are often used, and with great success, to clean connectors and other parts of the fiber optic cable systems. However, because of the different surfaces, pin configurations and the like, it has been found that for proper cleaning of these components, a one-size-fits-all cleaning implement is not the best solution. Rather, in certain instances, a specific, preferred swab material and configuration may be best suited for the cleaning application. And, it may not always be possible to have on hand all of the various sizes and configurations needed for a given use.

Accordingly, there is a need for a swab that is usable with multiple types and configurations of fiber optic connectors. Desirably, such a swab can be used to efficiently and effectively clean both side and end faces of connectors, as well as different types of connectors. Most desirably, such a swab eliminates the need for maintaining an inventory of different types of swabs needed for in-field fiber optic cable maintenance and repair.

BRIEF SUMMARY OF THE INVENTION

A cleaning swab is for wet or dry use. The swab includes an elongated polymeric handle having a cleaning head end and a grasping end. A cleaning head is mounted to the handle. The cleaning head is formed from a strip of material having an inner surface and an outer surface. The material is affixed to the handle at the inner surface, and extends along the handle, over the tip and along an opposite side of the handle to define a loop at the handle tip spaced from the tip. The strip of material that extends along the handle defines major cleaning surfaces and the loop defines an inner annular cleaning surface.

The swab is configured for use with multiple configurations and types of fiber optic connectors. The swab efficiently and effectively cleans both side and end faces of connectors. The inner annular cleaning surface is configured to clean connectors parts that extend generally normal to the longitudinal axis of the connector. Advantageously, the swab eliminates the need for maintaining an extensive inventory of different types of swabs for in-field fiber optic cable maintenance and repair. It is expected that the swab will be used in a lightly dampened state.

In a present swab, the cleaning head is formed as a strip of material that has a width about equal to the width of the handle. The handle can be formed from a static dissipative material or may have a static dissipative constituent.

The cleaning head material is preferably a non-woven material. One suitable material is a synthetic chamois. The synthetic chamois can be a polyurethane or polyvinyl acetate material. The material can also be a micro denier material. The material should prevent over-saturating the fiber optic connection which can cause signal distortion.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 illustrates a plan view of a three-sided swab embodying the principles of the present invention;

FIG. 2 is a side view of the swab of FIG. 1;

FIG. 3 is an enlarged, partial side view of the swab as indicted by the circled area in FIG. 2; and FIG. 4 is a perspective view of a connector having a pin that is oriented normal to the axis of the connector.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1 there is shown a swab 10 in accordance with the principles of the present invention. The swab 10 includes a handle 12 and a cleaning head 14. The handle 12 has a grasping end 16 and a cleaning head end 18.

The cleaning head 14 is formed from a material that is applied to the handle 12 in a flat, over-end wrapped construction as best seen in FIGS. 2 and 3. The flat construction provides two large, planar areas 20 over which components such as connectors can be cleaned and four edge areas 22 for cleaning smaller areas, for example, between the pins of connectors.

Importantly, the swab 10 has an over-end wrapped end or tip as indicated at 24. In this configuration, the cleaning head 14 has a blunted tip 26 as the cleaning head 14 material is wrapped over the tip 28 of the handle 12 to form a loop 30 at the end of the cleaning head 14. The handle 12 defines a longitudinal axis $A_{12}$. The loop 30 defines an inner or annular cleaning region 32. It will be appreciated that the annular cleaning region 32 (formed by the loop 30 tip) has been found to be extremely effective for, and innovative in its ability to, clean optical fibers that may be embedded in connector elements or shrouded by alignment pins.

In a present embodiment, the handle 12 is flat, that is, it has a generally rectangular cross-section, and the cleaning head 14 is formed as a strip that has a width $w_{14}$ that is about equal to the width $w_{12}$ of the handle 12. The cleaning head 14 material is wrapped over the tip 28 of the handle 12. This forms the two relatively large cleaning surfaces 20 on the major faces of the swab 10 (that is, the material covering the major sides of the handle 12), the smaller, edge-like cleaning surfaces 22 on the sides of the swab 10, and the inner or annular cleaning surface 32 within the loop portion 30 of the material that is folded over the handle tip 28. The loop portion 30 is not pulled tight over the handle tip 28. Rather, the material is loosely wrapped over the tip 28 to specifically define the enclosed cleaning region 32.

In a present swab 10, the swab 10 has a length $l_{10}$ of about 3.25 inches (about 8.25 cm), including the distance created by the cleaning head 14 material being wrapped over the tip 28. In that the material is relatively thin and the "loop" 30 is relatively small, the length $l_{12}$ of the handle 12 is essentially equal to the overall swab length $l_{10}$. The length $l_{14}$ of the head 14 is about 0.88 inches (about 22.3 mm).

A present swab 10 has a width $w_{10}$ of about 0.38 inches (about 9.6 mm), and again, this is essentially equal to the width $w_{12}$ of the handle 12 so that the cleaning head 14 material is coextensive with the handle 12 width. In a present swab 10, the handle 12 has a thickness $t_{12}$ of about 0.07 inches (about 1.7 mm). The handle 12 can be formed from a polymeric material, such as acrylonitrile-butadiene-styrene (ABS). The material can be formulated or filled with additional desired constituents, such as a static dissipative material, for a particular application or service.

The cleaning head 14 material is a soft, absorbent material. It is anticipated that a non-woven material that is dust and lint free (that is, it does not flake or shed fibers or the like). Preferably, such a material absorbs oils as well as water and other aqueous liquids. One material that is particularly suited for use as the cleaning head 14 material is chamois, and more particularly, synthetic chamois. Such a material exhibits the above-noted desired characteristics, while at the same time, is sufficiently durable so that it an be used to remove contaminants by abrading (e.g., scrubbing the dirt) from around the fiber optic connection components. Synthetic chamois can be made from, for example, polyurethane, polyvinyl acetate and other like-based materials. Other suitable materials, such as polyester, micro denier or other cleaning textiles or fabrics may also be used. Preferably, the material prevents oversaturating the fiber optic connection which can cause signal distortion.

It will be understood that often, the swab 10 is used in a combination cleaning method, in conjunction with a spray cleaner or degreaser, such as one of the ELECTRO-WASH® brand cleaners (for example, ELECTRO-WASH® PX, ELECTRO-WASH® MX, and ELECTRO-WASH® CZ) commercially available from ITW Chemtronics of Kennesaw, Ga. As such, any material that is used for the cleaning head 14 should be compatible with any anticipated cleaners or solvents.

One of the advantages of the present swab 10 is the annular cleaning surface 32. As will be appreciated, the loop over the tip 28 forms the annular cleaning surface 32. It has been found that with many connector that have projection like pins, it is difficult to assure proper cleaning of the entirely of the body of the pin. In addition, some connectors are formed having pins P that extend from the connector C at an angle (generally normal) to a longitudinal axis $A_C$ of the connector C (see, for example, FIG. 4).

The present swab loop annular cleaning surface 32 provides an arrangement by which these projecting pins or connections P can be efficiently and effectively cleaned by use of a single cleaning implement or tool, without having to overly manipulate the tool. At the same time, it also assures that a large cleaning surface 20 is available to apply to the connector C surface, rather that having to rely on edges and comers of standard tools.

It will also be appreciated that the loop cleaning surface 32 (which is formed as a looped tip) provides a cushioned surface to permit more exercised cleaning of connector C surfaces. That is, because the loop 30 essentially forms a cushion, a greater amount of force can be used to scrub surfaces clean.

The present swab 10 can be used for cleaning sensitive components and surfaces such as fiber optics connectors, telecommunications components and the like. A swab 10 in accordance with the present invention leaves little to no residue (e.g., fibers) from the device within the component or on the surface, and can be used wet or dry (i.e., with or without a solvent) to facilitate cleaning. The swab 10 has been found to be structurally stable when used wet or dry.

In certain connectors in which the fiber strands are aligned with metal pins (to assure continuity of the signal between the connections), since the connections are minute, they are often "shrouded" by the alignment pins, such as in MT-type ribbon connector. This makes cleaning a difficult operation. It has been found that the present swab 10 extremely effective in carrying out these difficult but necessary cleaning operations.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A cleaning swab for wet or dry use, comprising:
   a handle defining a longitudinal axis, the handle being elongated and having a cleaning head end and a grasping end, the handle defining a tip; and
   a cleaning head mounted to the handle, the cleaning head formed from a strip of material having an inner surface and an outer surface, the material being affixed to the handle at the inner surface, and extending along the handle, over the tip and along an opposite side of the handle to define a closed end and a loop at the tip spaced from the tip, wherein the strip of material extending along the handle defines a major cleaning surface and wherein the loop defines an inner annular cleaning surface oriented transverse to the longitudinal axis of the handle and located between the tip and a folded end of the material.

2. The cleaning swab in accordance with claim 1 wherein the handle is formed having a rectangular cross-section.

3. The cleaning swab in accordance with claim 2 wherein the cleaning head is formed as a strip of material and wherein the strip of material has a width about equal to a width of the handle.

4. The cleaning swab in accordance with claim 1 wherein the handle is formed from a polymeric material.

5. The cleaning swab in accordance with claim 4 wherein the polymeric material includes a static dissipative constituent.

6. The cleaning swab in accordance with claim 1 wherein the cleaning head material is a non-woven material.

7. The cleaning swab in accordance with claim 6 wherein the non-woven material is a synthetic chamois.

8. The cleaning swab in accordance with claim 7 wherein the synthetic chamois is a polyurethane or polyvinyl acetate material.

9. The cleaning swab in accordance with claim 6 wherein the material is a micro denier material.

10. A cleaning swab comprising:
    an elongated polymeric handle having a rectangular cross-section, the handle defining a longitudinal axis and having a cleaning head end having a tip, the handle having a width and a thickness; and
    a cleaning head mounted to the handle at the cleaning head end, the cleaning head formed from a strip of non-woven material having a width about equal to the width of the handle, the material having an inner surface and an outer surface, the material being affixed to the handle at the inner surface, and extending along the handle, over the tip and along an opposite side of the handle to define a closed end and a loop at the tip spaced from the tip, wherein the strip of material extending along the handle defines major cleaning surfaces and wherein the loop is oriented transverse to the longitudinal axis of the handle and located between the tip and a folded end of the material and defines an inner annular cleaning surface at the inner surface of the strip.

11. The cleaning swab in accordance with claim 10 wherein the polymeric material includes a static dissipative constituent.

12. The cleaning swab in accordance with claim 10 wherein the non-woven material is a synthetic chamois.

13. The cleaning swab in accordance with claim 12 wherein the synthetic chamois is a polyurethane or polyvinyl acetate material.

14. The cleaning swab in accordance with claim 10 wherein the material is a micro denier material.

\* \* \* \* \*